(12) United States Patent
Pursifull

(10) Patent No.: US 9,080,518 B2
(45) Date of Patent: Jul. 14, 2015

(54) SYSTEM AND METHOD FOR OPERATING AN ENGINE COMBUSTING LIQUEFIED PETROLEUM GAS

(71) Applicant: Ford Global Technologies, LLC, Dearborn, MI (US)

(72) Inventor: Ross Dykstra Pursifull, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 82 days.

(21) Appl. No.: 13/970,519

(22) Filed: Aug. 19, 2013

(65) Prior Publication Data

US 2015/0047350 A1    Feb. 19, 2015

(51) Int. Cl.
| | |
|---|---|
| F02B 33/44 | (2006.01) |
| F02D 23/00 | (2006.01) |
| F02B 7/00 | (2006.01) |
| F02M 21/02 | (2006.01) |
| F02B 13/00 | (2006.01) |
| F01P 7/16 | (2006.01) |
| F02D 19/06 | (2006.01) |

(52) U.S. Cl.
CPC ....... *F02D 19/0647* (2013.01); *F02M 21/0212* (2013.01); *F02M 21/0275* (2013.01); *F02M 21/0278* (2013.01); *F02M 21/0284* (2013.01)

(58) Field of Classification Search
USPC ......... 60/598, 601, 605.1; 123/431, 525, 575, 123/578
See application file for complete search history.

(56) References Cited

U.S. PATENT DOCUMENTS

| | | | |
|---|---|---|---|
| 5,479,906 A | 1/1996 | Collie | |
| 6,227,173 B1 | 5/2001 | Bennett | |
| 7,546,834 B1 * | 6/2009 | Ulrey et al. | 123/525 |
| 8,516,997 B2 | 8/2013 | Pursifull | |
| 2001/0003977 A1 * | 6/2001 | Hayashi et al. | 123/480 |
| 2009/0090331 A1 | 4/2009 | Pursifull | |
| 2009/0265078 A1 * | 10/2009 | Mallebrein et al. | 701/103 |
| 2012/0041665 A1 * | 2/2012 | Pursifull et al. | 701/103 |

OTHER PUBLICATIONS

Pursifull, Ross Dykstra, "Method and System for Gaseous and Liquid Fuel Injection," U.S. Appl. No. 13/973,842, filed Aug. 22, 2013, 35 pages.
Pursifull, Ross D. et al., "High Pressure Fuel Pump Control for Idle Tick Reduction," U.S. Appl. No. 14/042,971, filed Oct. 1, 2013, 34 pages.
Ulrey, Joseph N. et al., "Currect Pulsing Control Methods for Lift Fuel Pumps," U.S. Appl. No. 14/444,739, filed Jul. 28, 2014, 48 pages.
Pursifull, Ross D., "Method and System for Supplying Liquefied Petroleum Gas to a Direct Fuel Injected Engine," U.S. Appl. No. 14/532,756, filed Nov. 4, 2014, 39 pages.
Ulrey, Joseph N. et al., "Optimizing Intermittent Fuel Pump Control," U.S. Appl. No. 14/558,363, filed Dec. 2, 2014, 44 pages.
Pursifull, Ross D., "Direct Injection Pump Control," U.S. Appl. No. 14/560,497, filed Dec. 4, 2014, 49 pages.

\* cited by examiner

*Primary Examiner* — Audrey K Bradley
(74) *Attorney, Agent, or Firm* — Julia Voutyras; Alleman Hall McCoy Russell & Tuttle LLP

(57) ABSTRACT

A method and system for operating an engine that is supplied a fuel having a low super critical temperature is presented. In one example, the method supplies excess fuel to a direct injection fuel rail to cool a portion of the fuel system that is near direct fuel injectors. The heat is drawn from the direct injection fuel rail to a fuel tank where the heat is removed via injecting fuel vapors to the engine.

19 Claims, 4 Drawing Sheets

SYSTEM AND METHOD FOR OPERATING AN ENGINE COMBUSTING LIQUEFIED PETROLEUM GAS

FIELD

The present description relates to a system for improving operation of an internal combustion engine that is operated with liquefied petroleum gas. The method may be particularly useful for engines operate over a range of environmental conditions.

BACKGROUND AND SUMMARY

Liquefied petroleum gas (LPG), primarily comprised of propane, may be used as a fuel for an internal combustion engine. LPG has a relatively low super critical temperature of about 96° C. If LPG is elevated to temperatures greater than its critical temperature, it may be supplied to an engine in an unknown density, between gaseous and liquid states. If LPG is supplied to the engine at temperatures less than its critical temperature, it may be supplied to engine fuel injectors in a liquid state. LPG exiting the fuel injector may exit the fuel injector and flash to a gaseous state with speed. Supplying LPG in a liquid state may be desirable because liquid fuel may be supplied directly into a cylinder where it evaporates and cools the cylinder air-fuel mixture so that the engine may tolerate additional spark advance and be less prone to engine knock. However, engine compartment temperatures may reach levels higher than the critical temperature of LPG. Consequently, there may be conditions when LPG changes state to supercritical before it is injected to the engine. The fuel's state change from liquid to supercritical may result in engine air-fuel ratio errors and an increase in the engine's propensity to knock when the gaseous fuel is injected to the engine.

The inventor herein has recognized the above-mentioned disadvantages and have developed a method for operating an engine, comprising: supplying liquefied petroleum gas (LPG) in a liquid phase directly into a cylinder of an engine in response to a temperature of a fuel system being less than a threshold level; and ceasing to supply LPG directly into the cylinder and supplying LPG into an intake port of the cylinder in response to the temperature of the fuel system being greater than the threshold level.

By injecting fuel vapor from a fuel tank, it may be possible to provide the technical result of cooling fuel supplied to a direct injection fuel pump and fuel rail so that there may be a reduced possibility of fuel transitioning to a super-critical or gaseous phase. For example, if fuel pumped from a direct fuel injection pump begins to approach a temperature where the fuel changes state from liquid to gas, a portion of fuel in a direct injection fuel rail may be returned to a fuel storage tank to remove heat from the direct injection fuel rail. If a pressure in the direct injection fuel rail at a time before fuel is returned to the fuel tank is maintained at a time when fuel is being returned to the fuel tank, consistent fuel injection may be maintained while heat is removed from the direct injection fuel rail. The heat removed from the fuel rail and returned to the fuel tank may raise fuel tank temperature, thereby producing fuel vapors. Heat in the fuel tank may be reduced via injecting the fuel vapors from the fuel tank to the engine. In this way, heat may be removed from a fuel system so that fuel may stay in a liquid state at direct fuel injectors.

The present description may provide several advantages. In particular, the approach may reduce engine air-fuel ratio errors by allowing fuel to be injected in a known state. Further, the approach may remove heat from a direct injection fuel system so as to allow injection of fuel in a liquid state. Further still, the approach may also improve the way boost is provided to an engine.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

The present description is related to improving operation of an engine that combusts LPG. The engine may be included in a system as is described in FIG. 1. Fuel may be supplied to the engine via a fuel system as described in FIG. 2. LPG may be supplied to an engine in a liquid or gaseous state according to the method of FIG. 3. The method of FIG. 3 may provide engine operation as indicted in FIG. 4.

Figure 1:
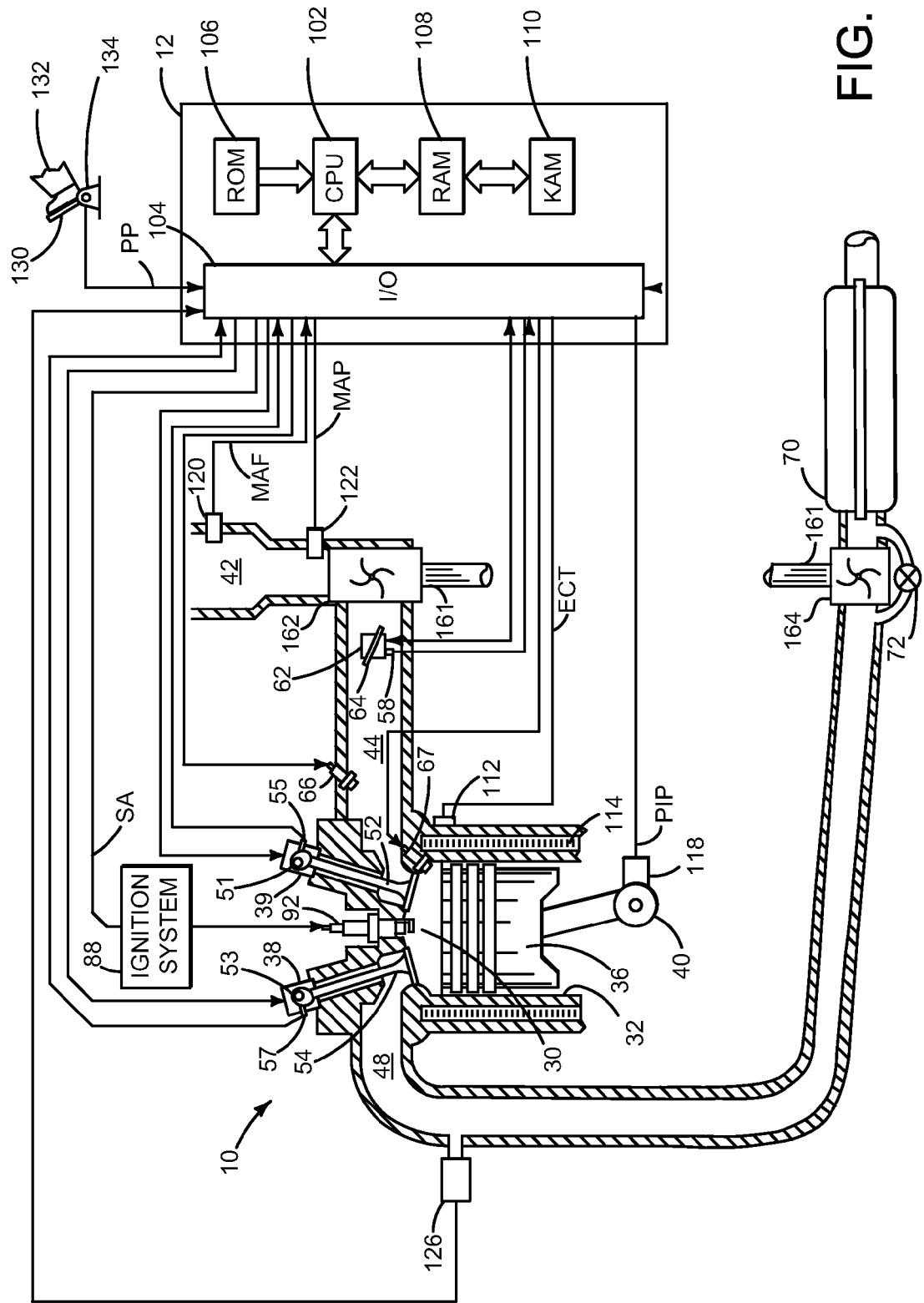
FIG. 1 is a schematic diagram of an engine.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. Timing of intake cam 51 and exhaust cam 53 may be moved relative to crankshaft 40 via exhaust cam phaser 38 and intake cam phaser 39. The position of intake cam 51 may be determined by intake cam sensor 55. The position of exhaust cam 53 may be determined by exhaust cam sensor 57.

Direct fuel injector 67 is shown positioned to inject liquid fuel directly into cylinder 30, which is known to those skilled in the art as port injection. Fuel injector 67 delivers liquid fuel in proportion to the pulse width of signal from controller 12. Fuel is delivered to fuel injector 67 by a fuel system (FIG. 2) including a fuel tank, fuel pump, and fuel rail. Gaseous fuel may also be supplied to cylinder 30 via port fuel injector 66. In addition, intake manifold 44 is shown communicating with optional electronic throttle 62 which adjusts a position of throttle plate 64 to control air flow from air intake 42 to intake manifold 44.

Turbocharger compressor 162 compresses air from air intake 42 before supplying the air to the intake manifold. Turbocharger compressor 162 rotates via engine exhaust gas energy supplied to turbine 164. Shaft 161 mechanically couples turbocharger compressor 162 to turbine 164. Waste gate 72 may be selectively opened and closed to control a speed of compressor 162. Waste gate 72 allows exhaust gases to bypass turbine 164 when compressor 162 is approaching an upper compressor speed.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by foot 132; a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

In some examples, the engine may be coupled to an electric motor/battery system in a hybrid vehicle. The hybrid vehicle may have a parallel configuration, series configuration, or variation or combinations thereof. Further, in some examples, other engine configurations may be employed, for example a V or I configuration engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

Figure 2:
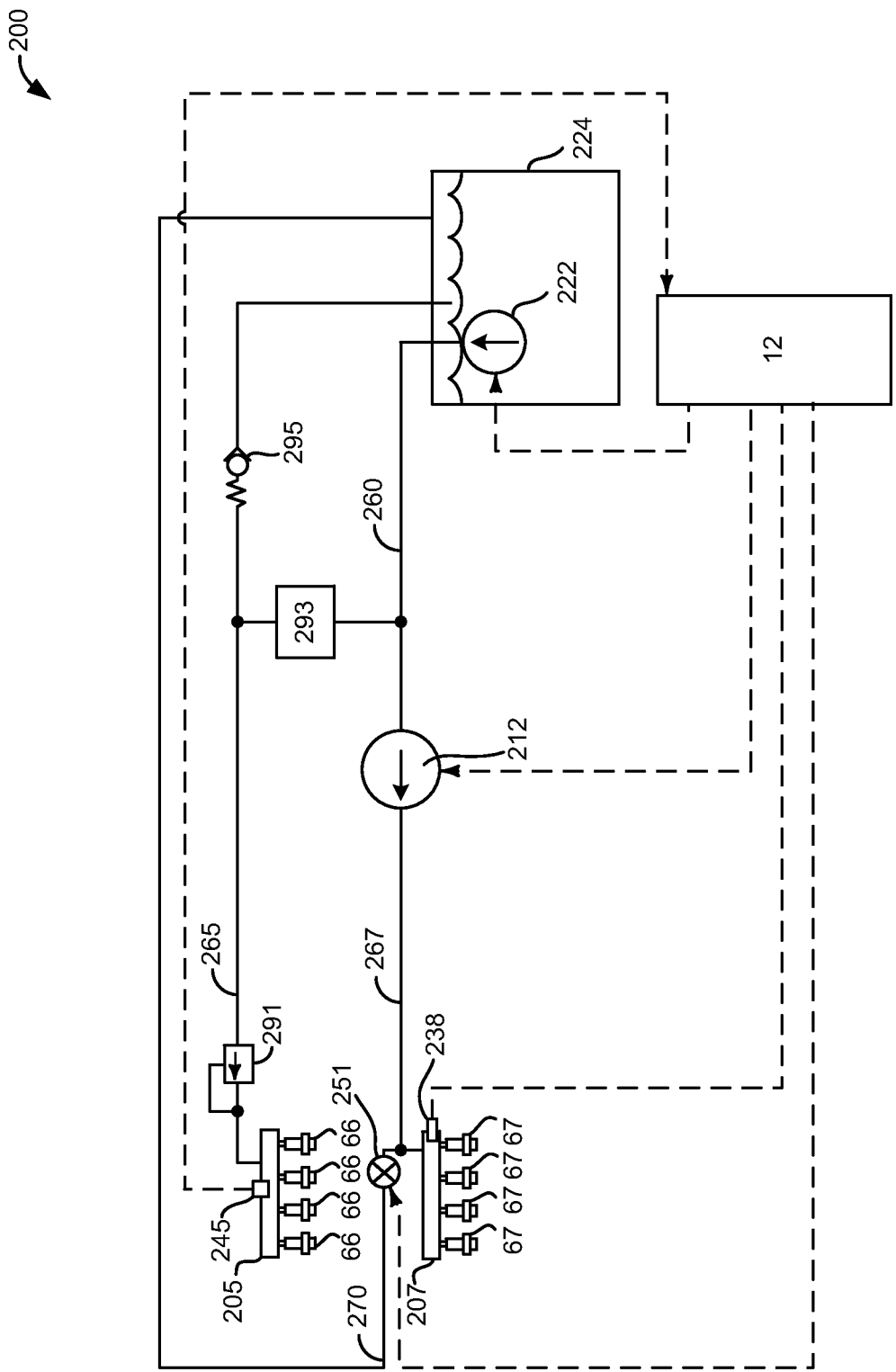
FIG. 2 is an example system for supplying fuel to the engine.

Referring now to FIG. 2, an example fuel system is shown. Electrical connections between devices are shown as dashed lines. Fluidic connections between devices are shown as solid lines.

Fuel system 200 includes a fuel tank 224 for storing LPG. Fuel stored in fuel tank 224 may be pumped out of fuel tank 224 via lift pump 222. Operation of lift pump 222 is controlled by controller 12. For example, controller 12 may increase current flow to lift pump 222 to increase lift pump output pressure. Controller 12 may decrease current flow to lift pump 222 to reduce lift pump output pressure. Lift pump 222 supplies LPG to direct injection fuel pump 212 via fuel passage or conduit 260.

Direct injection fuel pump 212 may provide liquid fuel to fuel rail 207 and direct fuel injectors 67 when a temperature of fuel in fuel rail 207 is less than a threshold temperature. By supplying liquid fuel to the engine, engine efficiency and performance may be improved since the engine may tolerate greater spark advance and higher boost pressures. The liquid fuel changes state to a gaseous fuel within the engine cylinder, thereby cooling the in cylinder air-fuel mixture. The lower cylinder charge temperature allows spark to be advanced as compared to spark timing for the same fuel injected in a gaseous state. Return valve 251 may be selectively opened and closed in response to fuel temperature indicted by temperature sensor 238. Sensor 238 may combine the measurement of both fuel rail temperature and fuel rail pressure. Opening return valve 251 allows fuel to be returned to fuel tank 224 via fuel passage 270. In some examples, CNG in fuel passage 267 or fuel rail 207 may vaporize after engine rotation is stopped and engine heat increases. Therefore, return valve 251 may be opened to purge gaseous fuel from the liquid fuel delivery path.

In some examples, direct fuel injectors 67 may be replaced with port injectors to inject LPG in a liquid state. However, engine performance may be reduced if direct fuel injectors 67 are replaced with port fuel injectors.

Gaseous fuel formed via evaporative cooling in fuel tank 224 may be supplied to port fuel injectors 66 and port fuel injection rail 205 via fuel passage or conduit 265. Conduit 265 may contain a pressure regulator 291 to reduce tank pressure to a fixed or commanded level. A pulse width supplied by controller 12 to operate port fuel injectors 66 may be adjusted in response to gaseous fuel pressure indicated by pressure sensor 245. Sensor 245 may combine both fuel rail pressure and fuel rail temperature measurements. Alternatively, gaseous fuel may be supplied via evaporator 293 which is supplied fuel via conduit 260. Check valve 295 prevents fuel vapors from returning to fuel tank 224.

Controller 12 operates return valve 251 to return excess or vaporized LPG to fuel tank 224. Controller 12 also selectively operates direct fuel injectors 67 and port fuel injectors 66. Additionally, controller 12 adjusts an inlet flow control valve of direct fuel injection pump 212 to control direct injection pump output pressure.

Thus, the system of FIGS. 1 and 2 provides for an engine system, comprising: an engine including a cylinder; a fuel system including a port fuel injector supplying gaseous fuel to the cylinder and a direct fuel injector supplying liquid fuel to the cylinder, the fuel system also including a direct injection fuel pump supplying a first fuel to the direct fuel injector; and a controller including executable instructions stored in non-transitory memory for activating and deactivating the port fuel injector and the direct fuel injector in response to a temperature of the fuel system.

The engine system also includes where the temperature of the fuel system is a temperature of fuel in a direct injection fuel rail. The engine system also includes where the temperature of the fuel system is a temperature of fuel in a fuel tank. The engine system includes where the port fuel injector is activated in response to the temperature of the fuel system exceeding a threshold temperature. The engine system includes where the direct fuel injector is deactivated in response to the temperature of the fuel system exceeding the threshold temperature. The engine system further comprises a turbocharger and additional instructions to increasing boost via the turbocharger in response to activating the direct fuel injector. The engine system further comprises a turbocharger and additional instructions to decrease boost via the turbocharger in response to activating the port fuel injector.

Figure 3:
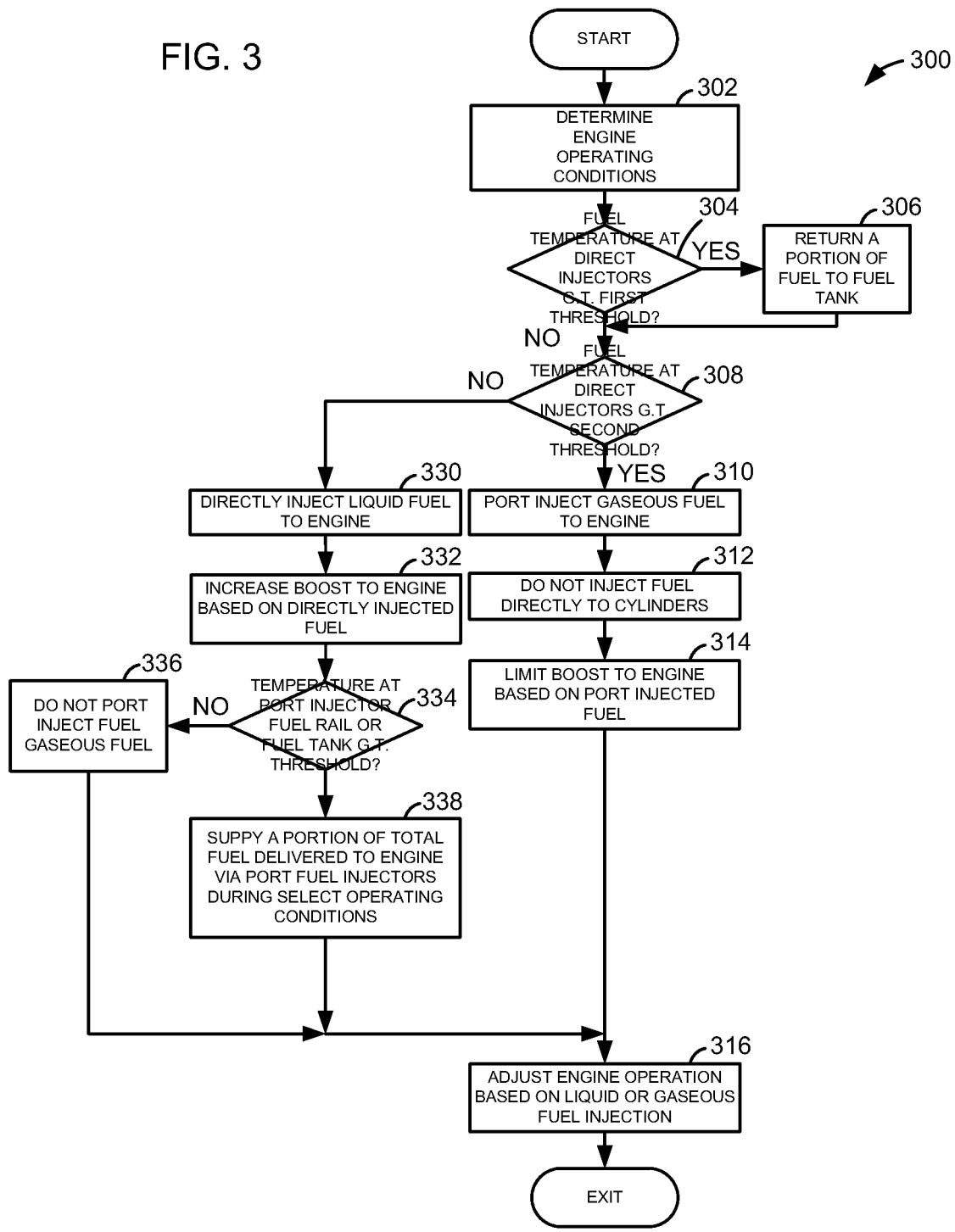
FIG. 3 is a flowchart of an example method for operating the engine.

Referring now to FIG. 3, a method for operating an engine is shown. The method of FIG. 3 may be stored as executable instructions in non-transitory memory of controller 12. Additionally, method of FIG. 3 may provide the operating sequence shown in FIG. 4.

At 302, method 300 determines engine operating conditions. Engine operating conditions may include, but are not limited to engine speed, engine load, engine torque, engine coolant temperature, engine cylinder head temperature, fuel pressure, and ambient temperature. Method 300 proceeds to 304 after engine operating conditions are determined.

At 304, method 300 judges whether or not a temperature (measured or inferred) of fuel at the direct fuel injectors is greater than a first threshold temperature. In one example, the first threshold temperature may be a critical temperature of the fuel. In another example, the first threshold temperature may be a temperature that is less than the critical temperature of the fuel by a predetermined temperature (e.g., 10° C. less than the critical temperature of LPG (96° C.)). If method 300 judges that the fuel temperature at the direct fuel injectors is greater than (G.T.) the first threshold temperature, the answer is yes and method 300 proceeds to 306. Otherwise, the answer is no and method 300 proceeds to 308.

At 306, method 300 returns fuel at the direct injectors back to the fuel tank. In one example, a fuel return valve is opened and fuel is returned to the fuel tank. For example, valve 251 of FIG. 2 may be at least partially opened to return a portion of fuel delivered to direct injection fuel rail 207 to fuel tank 224. Method 300 proceeds to 308 after the fuel is returned to the fuel tank. Operation 306 may be done prior to commencing liquid injection to a warmed up engine. Fuel rail purge may be conducted with the lift pump providing the purging fuel flow. The direct injection fuel pump may not provide the requisite flow for purge before the engine is started. Thus, fuel may be purged via a lift pump supplying fuel to the direct injection fuel pump.

At 308, method 300 judges whether or not a temperature at direct fuel injectors is greater than a second threshold temperature. In one example, the second threshold temperature may be greater than the first threshold temperature mentioned at 306. For example, the second threshold temperature may be a critical temperature of the fuel delivered to the direct fuel injectors. If method 300 judges that the temperature at the direct fuel injectors is greater than (G.T.) the second threshold temperature, the answer is yes and method 300 proceeds to 310. Otherwise, the answer is no and method 300 proceeds to 330.

It should be noted that other temperatures in the fuel system may be substituted for fuel temperature at the direct injector fuel rail. For example, fuel temperature at the direct injection fuel pump inlet or in the fuel tank may be substituted or conditionally be required to be greater than threshold temperatures to provide an answer of yes and proceed according to a yes answer.

At 310, method 300 injects gaseous fuel to the engine via port injectors. The gaseous fuel is fuel that is vaporized in the fuel tank or vaporized fuel returned to the fuel tank from the direct injection fuel rail. A pulse width of port injectors is adjusted in response to operating conditions including engine speed, engine torque demand, and port fuel injector rail pressure (e.g., fuel pressure). Vaporized LPG may be used to operate the engine when the phase or state of fuel exiting the direct injection fuel pump may be gaseous or indeterminate. Method 300 proceeds to 312 after gaseous fuel injection to the engine begins. Alternatively, the gaseous fuel may be supplied to the gaseous injectors via fuel vaporizer if the fuel tank pressure is insufficient to provide the design level of gaseous injection pressure.

At 312, method 300 stops injecting fuel to engine cylinders if fuel is being directly injected to engine cylinders. Direct fuel injection may be stopped via closing direct injectors. Additionally, the flow rate of fuel through the direct injection fuel pump may be reduced to near zero via adjusting operation of the direct injection fuel pump inlet control valve. Reducing the amount of fuel pumped through the direct injection fuel pump may help to further reduce the fuel temperature at the fuel pump. Alternatively, the direct fuel injection pump may remain pumping while a return valve is opened to cool the direct injection fuel rail via conductive cooling. Method 300 proceeds to 314 after direct fuel injection to the engine is stopped.

At 314, method 300 reduces engine boost (e.g., air pressure supplied to the engine intake manifold or an area between a throttle and a compressor) based on vaporized LPG being injected to the engine. The engine's boost limit is reduced as compared to boost provided to the engine when the engine is operated with liquid LPG. The gaseous phase LPG may not cool the cylinder charge mixture as well as when liquid phase LPG is injected. Consequently, engine boost may be reduced to reduce the possibility of engine knock. In one example, boost may be reduced via opening a turbocharger waste gate. Method 300 proceeds to 316 after engine boost is adjusted.

At 316, method 300 adjusts engine operation based on injection of liquid or gaseous phase LPG. If liquid phase LPG is injected to the engine, spark timing is advanced as compared to spark timing if the engine were operated at similar conditions with gaseous phase LPG. Further, cam timing adjustments, valve lift adjustments, and other adjustments may be applied depending on whether liquid or gaseous phase LPG is injected to the engine. Method 300 proceeds to exit after engine actuators are adjusted to compensate for the phase of fuel injected.

At 330, method 300 begins directly injecting liquid fuel to the engine via direct injectors. The amount of fuel injected is varied as engine demand torque and engine speed varies. The liquid fuel is supplied from the same fuel tank that supplies the gaseous fuel. Method 300 proceeds to 332 after injection of liquid fuel to the engine via direct injectors begins.

At 332, method 300 increases boost supplied to the engine. The engine boost amount is increased to increase engine performance. Since injecting liquid LPG may allow the engine to operate at higher engine speeds and torque demands without encountering engine knocking, boost pressure limits for the engine are increased. Boost pressure may be increased via closing a turbocharger waste gate. Method 300 proceeds to 334 after engine boost limits are increased.

At 334, method 300 judges whether or not a temperature at the port fuel injector fuel rail is greater than a threshold temperature or if a temperature at the fuel tank is greater than a threshold temperature. Additionally, method 300 may judge whether or not an intake manifold pressure is less than a pressure at the port injection fuel rail. If temperatures at the port fuel injector rail or fuel tank are greater than threshold temperatures, and/or if a pressure in the intake manifold is less than a pressure at the port injection fuel rail, the answer is yes and method 300 proceeds to 338. Otherwise, the answer is no and method 300 proceeds to 336.

At 336, method 300 stops or prevents fuel from being injected to the engine via the port fuel injectors. Fuel flow through the port fuel injectors may be stopped via closing the port fuel injectors. Method 300 proceeds to 320 after port injectors have been closed.

At 338, method 300 supplies a portion of fuel delivered to the engine via port fuel injectors. In one example, the port fuel injectors are operated at lower engine loads so that fuel may be drawn into the intake manifold when intake manifold pressure is at a lower level. The port injected gaseous fuel may be sourced via a fuel tank or an evaporator. Thus, the engine may be simultaneously supplied gaseous and liquid fuel (e.g., gaseous and liquid LPG). Method 300 proceeds to 320 after the port fuel injectors are selectively operated.

In this way, gaseous fuel and liquid fuel may originate from a single fuel tank to provide improved engine operation. Further, the liquid and gaseous fuels are supplied to different injectors that provide fuel to the engine at locations that are more suitable for the state of fuel being provided to the engine. For example, gaseous fuel is provided to port fuel injectors while liquid fuel is provided to direct injectors.

Thus, the method of FIG. 3 provides for operating an engine, comprising: supplying liquefied petroleum gas (LPG) in a liquid phase directly into a cylinder of an engine in response to a temperature of a fuel system being less than a threshold level; and ceasing to supply LPG directly into the cylinder and supplying LPG into an intake port of the cylinder in response to the temperature of the fuel system being greater than the threshold level. The method includes where the temperature of the fuel system is a fuel temperature at a direct injector fuel rail. The method includes where the LPG supplied to the intake port is supplied in a gaseous phase.

In some examples, the method further comprises adjusting opening time of a port fuel injector in response to a pressure of the LPG supplied to the intake port. The method further comprises increasing a boost limit of the engine when supplying LPG in the liquid phase directly into the cylinder. The method further comprises decreasing the boost limit of the engine when supplying LPG into the intake port of the cylinder. The method includes where the temperature of the fuel system is a temperature of fuel in a fuel tank.

The method of FIG. 3 also provides for operating an engine, comprising: supplying liquefied petroleum gas (LPG) in a liquid phase directly into a cylinder of an engine via a fuel rail without purging LPG to a fuel tank in response to LPG temperature in the fuel rail being less than a threshold temperature; and purging the LPG from the fuel rail to the fuel tank in response to the LPG in the fuel rail being greater than the threshold temperature; and activating a port fuel injector and injecting at least a portion of the purged LPG in a gaseous phase to the engine via the port fuel injector in response to a temperature in a fuel system.

The method of FIG. 3 also includes where the temperature in the fuel system is the LPG temperature in the fuel rail. The method includes where the temperature in the fuel system is a fuel temperature in a fuel tank. The method further comprises ceasing to supply LPG in a liquid phase directly into the cylinder in response to activating the port fuel injector. The method further comprises continuing to supply LPG in a liquid phase directly into the cylinder while the port fuel injector is activated. The method further comprises increasing a boost limit of the engine in response to supplying LPG in the liquid phase directly into the cylinder.

Figure 4:
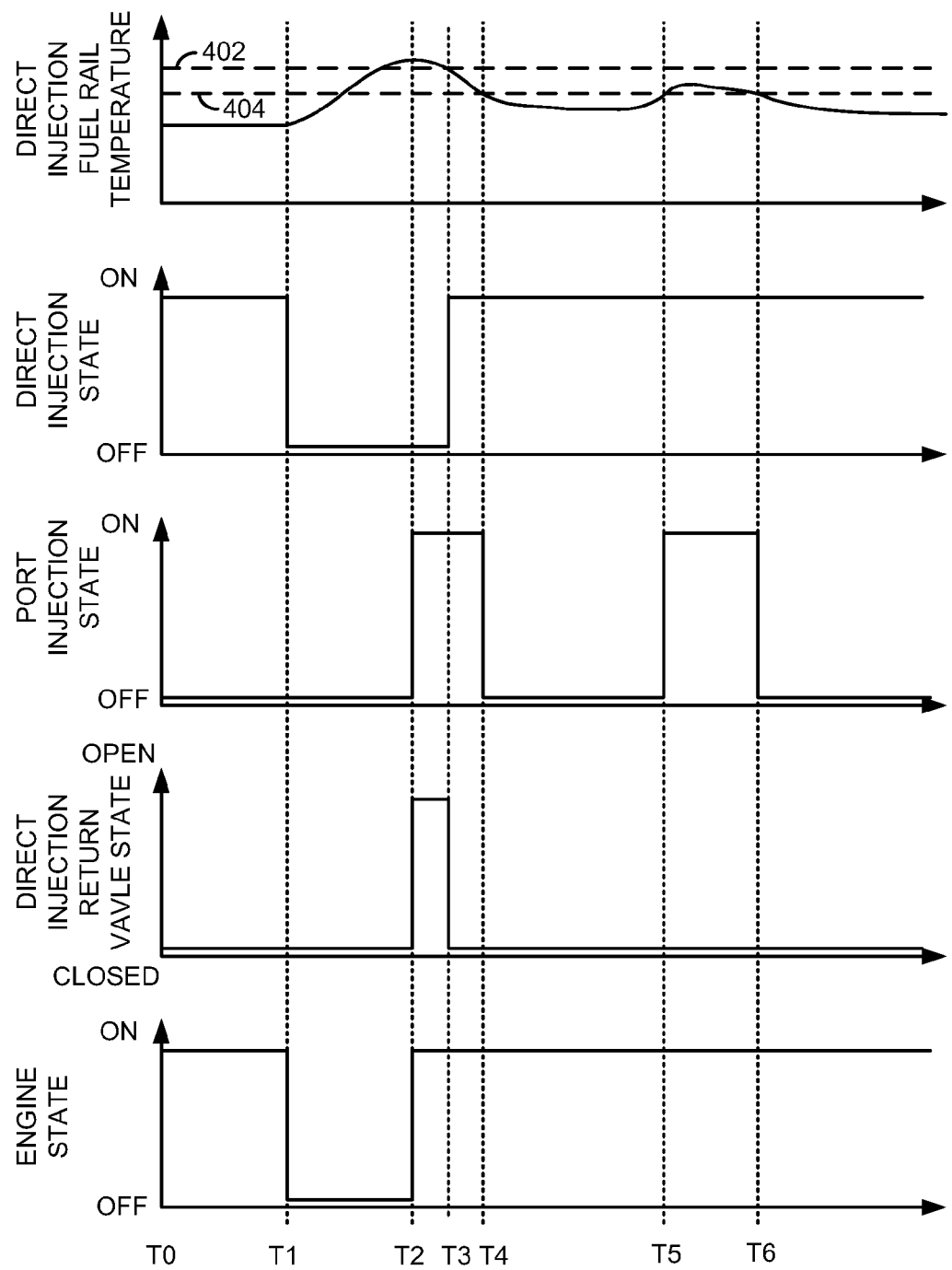
FIG. 4 is an example engine operating sequence according to the method of Fig.

Referring now to FIG. 4, an example engine operating sequence is shown. The example engine operating sequence of FIG. 4 may be provided via the system shown in FIGS. 1 and 2 executing the method of FIG. 3. Vertical markers T0-T6 represent times of interest during the operating sequence.

The first plot from the top of FIG. 4 represents temperature of fuel at direct fuel injectors versus time. The X axis represents time and time increases from the left side of the plot to the right side of the plot. The Y axis represents temperature of fuel at the direct fuel injectors and temperature of fuel at the direct fuel injectors increases in the direction of the Y axis arrow. Horizontal line 402 represents a threshold direct injection fuel temperature (e.g., a super critical temperature of LPG and first threshold temperature). Horizontal line 404 represents another threshold direct injection fuel temperature (e.g., a temperature below the critical temperature of LPG and a fourth threshold temperature).

The second plot from the top of FIG. 4 represents direct injection state versus time. The X axis represents time and time increases from the left side of the plot to the right side of the plot. The Y axis represents direct injection state and the direct injection state is on (e.g., directly injecting fuel) when the direct injection state trace is at a higher level. The direct injection state is off (e.g., not directly injecting fuel) when the direct injection state trace is at a lower level.

The third plot from the top of FIG. 4 represents port injection state versus time. The X axis represents time and time increases from the left side of the plot to the right side of the plot. The Y axis represents port injection state and the port injection state is on (e.g., port injecting fuel) when the port injection state trace is at a higher level. The port injection state is off (e.g., not directly injecting fuel) when the port injection state trace is at a lower level.

The fourth plot from the top of FIG. 4 represents direct injection return valve state versus time. The X axis represents time and time increases from the left side of the plot to the right side of the plot. The Y axis represents operating state for the direct injection return valve that directs fuel from the direct injection fuel rail to the fuel tank in response to direct injector fuel rail temperature. The direct injection return valve is open when the direct injection fuel return valve trace is at a higher level. The direct injection return valve is closed when the direct injection fuel return valve trace is at a lower level.

The fifth plot from the top of FIG. 4 represents engine state versus time. The X axis represents time and time increases from the left side of the plot to the right side of the plot. The Y axis represents engine state and the engine state is on when the engine state trace is at a higher level. The engine state is closed when the engine state trace is at a lower level.

At time T0, the engine is operating and combusting an air-fuel mixture as indicated by the engine state being at a higher level. The fuel temperature at the direct fuel injectors is at a temperature that is less than thresholds 402-404. Liquid state LPG is being directly injected to engine since the direct injection state in on as indicated by the higher level trace. Gaseous state LPG is not being port injected to the engine since the port injection state is off as indicated by the lower level trace.

At time T1, the engine operating state transitions to a lower level to indicate that engine rotation is stopped. The engine may stop in response to a driver request or the engine may be stopped automatically. The direct injection state also transitions to a lower level to indicate fuel is not being directly injected at engine stop. The port fuel injection also remains stopped and the evaporator fuel supply valve state remains closed. The temperature at the direct fuel injectors is below temperature thresholds 402-408.

Between time T1 and time T2, fuel temperature at the direct fuel injectors increases in response to heat remaining within the engine during the engine stop. The fuel temperature at direct fuel injectors increases above threshold temperatures 402 and 404. The engine state, port injection state, direct injection state, and direct injection fuel return valve state remain unchanged.

At time T2, the engine state transitions to a higher level to indicate that the engine is started in response to a driver demand (not shown). The port injection state also transitions from a lower level to a higher level to indicate that port fuel injection is activated. Direct fuel injection state remains at a lower level to indicate that direct fuel injection is deactivated. The fuel temperature at the direct fuel injectors remains above temperature thresholds 402 and 404. The direct injection return valve is also opened to allow the direct injection fuel pump to return fuel and vapor to the fuel tank. Additionally, output of the direct injection fuel pump may be adjusted (e.g., increased) to promote cooling of the direct injector fuel pump and the direct injection fuel rail.

As may be observed, during a hot engine soak (e.g., engine stop while the engine is warm), engine heat may increase temperature at direct fuel injectors to a temperature where LPG changes state from liquid to vapor. The vaporized fuel is returned to the fuel tank and injected to cylinder ports when the engine is restarted and temperature at direct fuel injectors is greater than threshold 402.

At time T3, fuel temperature at the direct injectors decreases to a temperature lower than the temperature at 402. The direct fuel injectors are activated in response to the fuel temperature at the direct injectors being lower than temperature 402. Further, the direct injection fuel return valve is closed when the direct injection fuel pump is activated. Thus, both the port fuel injectors and the direct fuel injectors are activated.

Between time T2 and time T4, fuel vapors flow from a fuel tank to the engine. Fuel vapors drawn from the fuel tank remove heat from the fuel tank. Drawing fuel vapors from the fuel tank reduces fuel temperature at the direct injector fuel rail as shown.

At time T4, the fuel temperature at the direct fuel injectors has decreased to less than thresholds 402 and 404. The direct injectors remain activated and the port injectors are deactivated in response to temperature at the direct fuel injectors being less than threshold 404. The engine remains operating. In this way, the engine may switch from injecting gaseous phase LPG to injecting liquid phase LPG.

Between time T4 and time T5, the fuel temperature at the direct fuel injectors decreases and then begins to increase. The direct injection state, port injection state, direct injection return valve state, and engine state remain unchanged. The fuel temperature at the direct injectors may increase after the engine is operated at low load shortly after being operated at a higher load.

At time T5, the fuel temperature at the direct injectors has increased to above level 404. Further, the direct injection fuel pump temperature is approaching, but has not reached level 402. The direct injection fuel return valve remains closed and the port fuel injectors are activated to draw gaseous fuel vapors from the fuel tank in response to fuel temperature at the direct injectors increasing to a level above 404. The direct injection state and the engine state remain at same levels.

At time T6, the fuel temperature at the direct injectors has cooled to be below level 404. Therefore, the port fuel injectors are deactivated and closed to allow injection of a greater fraction of liquid fuel which may allow additional spark advance without producing engine knock. The direct injection state and engine state remain at the same levels.

Thus, fuel may be returned to the fuel tank when fuel temperature at the direct injectors is greater than a threshold level without activating the port fuel injectors. Further, port fuel injectors may be activated to allow the engine to consume gaseous phase LPG and reduce heat energy in the fuel storage tank when direct injector are activated.

As will be appreciated by one of ordinary skill in the art, routine described in FIG. 3 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A method for operating an engine, comprising:
   supplying liquefied petroleum gas (LPG) in a liquid phase directly into a cylinder of an engine in response to a temperature of a fuel system being less than a threshold level; and
   ceasing to supply LPG directly into the cylinder and supplying LPG into an intake port of the cylinder in response to the temperature of the fuel system being greater than the threshold level.

2. The method of claim 1, where the temperature of the fuel system is a fuel temperature at a direct injector fuel rail, and wherein the LPG is supplied via direct injection only when the temperature is less than the threshold.

3. The method of claim 1, where the temperature of the fuel system is a temperature of fuel in a fuel tank.

4. The method of claim 1, where the LPG supplied to the intake port is supplied in a gaseous phase.

5. The method of claim 4, further comprising adjusting opening time of a port fuel injector in response to a pressure of the LPG supplied to the intake port.

6. The method of claim 1, further comprising increasing a boost limit of the engine when supplying LPG in the liquid phase directly into the cylinder.

7. The method of claim 6, further comprising decreasing the boost limit of the engine when supplying LPG into the intake port of the cylinder.

8. A method for operating an engine, comprising:
supplying liquefied petroleum gas (LPG) in a liquid phase directly into a cylinder of an engine via a fuel rail without purging LPG to a fuel tank in response to LPG temperature in the fuel rail being less than a threshold temperature; and
purging the LPG from the fuel rail to the fuel tank in response to the LPG in the fuel rail being greater than the threshold temperature; and
activating a port fuel injector and injecting at least a portion of the purged LPG in a gaseous phase to the engine via the port fuel injector in response to a temperature in a fuel system.

9. The method of claim 8, where the temperature in the fuel system is the LPG temperature in the fuel rail.

10. The method of claim 8, where the temperature in the fuel system is a fuel temperature in the fuel tank.

11. The method of claim 8, further comprising ceasing to supply LPG in a liquid phase directly into the cylinder in response to activating the port fuel injector.

12. The method of claim 8, further comprising continuing to supply LPG in a liquid phase directly into the cylinder while the port fuel injector is activated.

13. The method of claim 8, further comprising increasing a boost limit of the engine in response to supplying LPG in the liquid phase directly into the cylinder.

14. An engine system, comprising:
an engine including a cylinder and a turbocharger;
a fuel system including a port fuel injector supplying gaseous fuel to the cylinder and a direct fuel injector supplying liquid fuel to the cylinder, the fuel system also including a direct injection fuel pump supplying a first fuel to the direct fuel injector; and
a controller including executable instructions stored in non-transitory memory for
activating and deactivating the port fuel injector and the direct fuel injector in response to a temperature of the fuel system, and
increasing boost via the turbocharger in response to activating the direct fuel injector.

15. The engine system of claim 14, where the temperature of the fuel system is a temperature of fuel in a direct injection fuel rail.

16. The engine system of claim 14, where the temperature of the fuel system is a temperature of fuel in a fuel tank.

17. The engine system of claim 14, where the port fuel injector is activated in response to the temperature of the fuel system exceeding a threshold temperature.

18. The engine system of claim 14, where the direct fuel injector is deactivated in response to the temperature of the fuel system exceeding the threshold temperature.

19. The engine system of claim 14, further comprising additional instructions to decrease boost via the turbocharger in response to activating the port fuel injector.

* * * * *